United States Patent [19]

Akins et al.

[11] Patent Number: 5,018,162
[45] Date of Patent: May 21, 1991

[54] COMPACT EXCIMER LASER

[75] Inventors: Robert P. Akins; Donald G. Larson, both of San Digeo; Uday K. Sengupta, Del Mar; Richard L. Sandstrom, Encinitras, all of Calif.

[73] Assignee: Cymer Laser Technologies, San Diego, Calif.

[21] Appl. No.: 550,660

[22] Filed: Jul. 10, 1990

Related U.S. Application Data

[62] Division of Ser. No. 144,799, Jan. 15, 1988.

[51] Int. Cl.$^5$ ............................................. H01S 3/22
[52] U.S. Cl. ........................................ 372/57; 372/55; 372/58; 372/65; 372/86; 372/87
[58] Field of Search .................. 372/55, 57, 58, 65, 372/83, 86, 87

[56] References Cited

U.S. PATENT DOCUMENTS

| | | | |
|---|---|---|---|
| 4,088,965 | 5/1978 | Lauderslager et al. | 372/57 |
| 4,367,553 | 1/1983 | Nercher | 372/55 |
| 4,542,529 | 9/1985 | Pace et al. | 372/86 |
| 4,611,327 | 9/1986 | Clark et al. | 372/57 |

*Primary Examiner*—Georgia Epps
*Attorney, Agent, or Firm*—Ellsworth R. Roston; Charles H. Schwartz

[57] ABSTRACT

A compact excimer laser, including a housing structure having a plurality of walls forming an internal laser cavity. A gas is located within the laser cavity and with the gas capable of lasing action. A pair of spaced electrodes are located within the laser cavity and form an electrical discharge area between the electrodes for stimulating gas within the discharge area to lasing action in accordance with an electrical discharge between the electrodes. One of the pair of electrodes is located along a central position within the cavity and is grounded to the housing structure. The other of the pair of electrodes is located adjacent to but spaced from one of the walls of the housing structure and with the other electrode mounted on a main insulator member. The main insulator member is formed of ceramic material and is located intermediate to the one wall of the housing and the other electrode but is spaced from the one wall of the housing to have the main insulator member floating relative to the housing structure. The main ceramic insulator member is compressively supported at a central position of the member and extends outward from this central position without any additional support to have the floating main insulator respond to any bending forces within the laser without any constraint other than the central support.

6 Claims, 5 Drawing Sheets

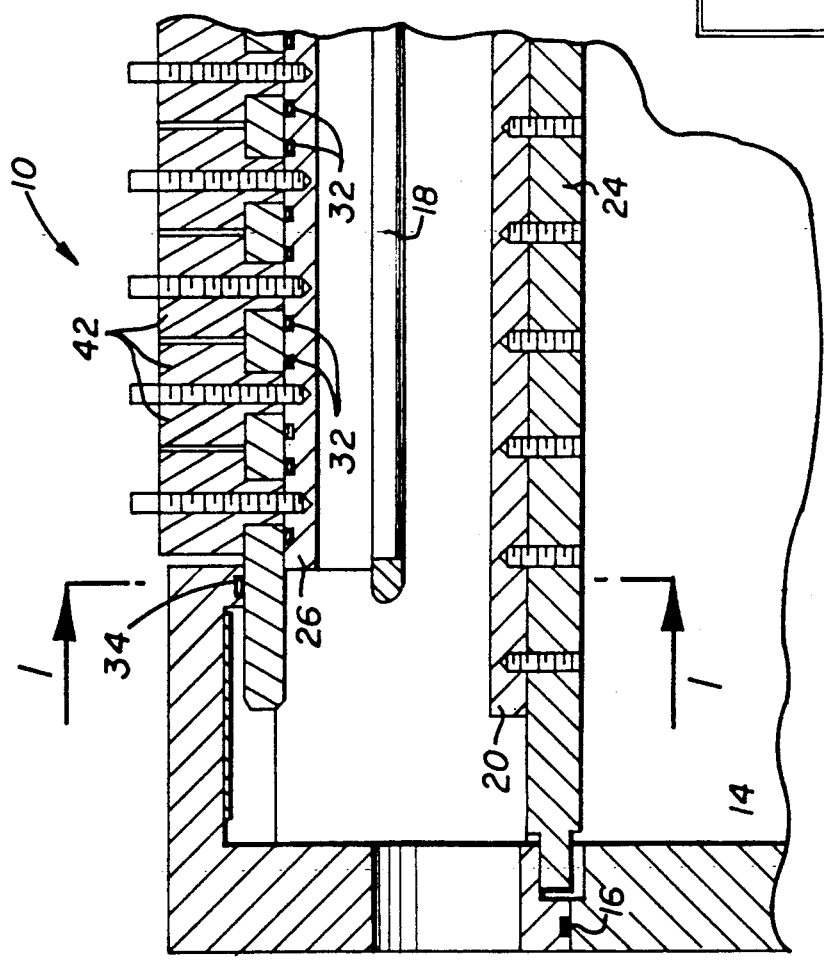
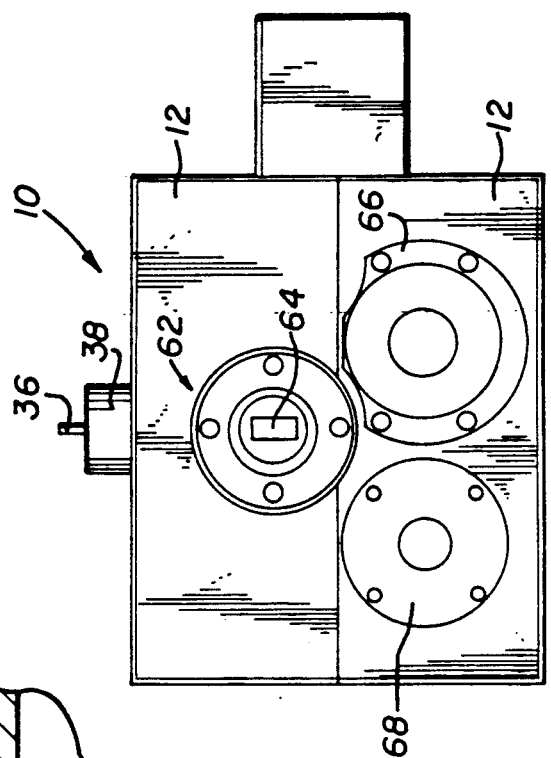

COMPACT EXCIMER LASER

This is a division of application Ser. No. 144,799, filed Jan. 15, 1988.

BACKGROUND OF THE INVENTION

1. Field of the Invention

The present invention relates to a compact excimer laser useful for both research and industrial applications. Although the excimer laser of the present invention is compact in size, it still has high overall reliability and long operational life when compared with prior art lasers.

2. DESCRIPTION OF THE PRIOR ART

Prior art lasers may be of many different types but the type of laser of interest in the present application is generally referred to as an excimer or rare gas halide type laser. Various types of commercially available excimer lasers are constructed to use a wide variety of rare gas halides such as XeCl, KrCl, ArF, KrF, XeF, etc. The use of the different rare gas halides provides for the production of output energy at particular wavelengths. As an example, an excimer laser using KrF as the gas produces output energy at the wavelength of two hundred and forty eight nanometers (248 nm).

The repetition rate of an excimer laser is generally limited to a low rate. This is because, in a static gas system, the same gas volume cannot be excited repeatedly to produce output radiation pulses of high energy. The production of the high energy output pulses can only occur if the gas is allowed to return to the initial thermal state between excitations. This return can take considerable time, on the order of a second. Therefore, the pulse rate for successive high energy pulses may be limited to about one pulse per second.

In order to overcome this pulse rate limitation in an excimer laser, prior art excimer lasers use a dynamic gas system where the gas flows through the excited area. The gas volume is exchanged a number of times between excitations so as to allow a higher repetition rate for the high energy pulses. The pulse repetition rate can, therefore, be increased by flowing the gas through the discharged area at relatively high speeds.

Prior art excimer lasers are also not very reliable. One problem with prior art excimer lasers is that they generally incorporate plastic insulating material within the internal structure of the laser. Unfortunately, the plastic insulation material tends to degrade and break down in the presence of the laser gas and ultraviolet photons, thereby producing contaminants within the laser. Ultimately, these contaminants degrade the performance of the laser and the laser must be shut down for gas replenishment.

One prior art technique employed to lengthen the life of the laser before the laser must be shut down for replenishment is to utilize an external gas reprocessor to constantly provide cleaned gas to the interior of the laser. The external gas reprocessor, for example, may include a sophisticated filtering system to provide for the cleaning of dirty gas from the laser to thereby provide for the clean filtered gas to be reintroduced into the laser, and in particular to crucial areas within the laser.

Because of the various difficulties with the prior art lasers described above, the prior art excimer lasers tend to be fairly large in size. This is because of the complexities of structures located within the laser and because of the necessity for external equipment which must be provided with the laser in order to insure a relatively long operational life for the use of the laser.

Excimer lasers are increasingly located within or near clean rooms since one large use of eximer lasers is for semiconductor applications. Since the cost of providing space within a clean room is relatively high, the large, prior art, excimer lasers are often not cost effective. It is therefore desirable to provide for excimer lasers of as small a size as possible. In addition, it is desirable to produce improvements in the performance and reliability of these prior art lasers. The present invention is therefore directed to provide size, performance and reliability improvements in an excimer laser.

SUMMARY OF THE INVENTION

The present invention provides for a compact excimer laser which has high overall reliability and improved performance when compared to prior art lasers. Specifically, the present invention provides for an excimer laser which is very compact in size to thereby have a small footprint and take up a relatively small amount of space such as in a clean room. Even though compact in size, the excimer laser of the present invention provides for a long operational life and does not require external gas reprocessing. If such an external gas reprocessor is provided, this provides an even greater operational life for the laser. All of the above is provided in a laser of the present invention having a high overall reliability.

The laser of the present invention uses no plastic insulating material located within the laser. Specifically, all of the insulating material is provided by ceramics of various types so that there is no plastic to degrade or break down and thereby produce contamination within the laser. The main ceramic insulator is provided in a stand-off configuration to thereby lengthen the path for current flow along the insulator to insure that, during discharge between the main cathode and anode within the laser, no electrical discharge takes place along the surface of the insulator. The specific configuration for the main insulator insures a minimum size for the laser without sacrificing power output. The main insulator is also supported in compression at a center position and floats out from this center position. The insulator is, therefore, held at the center position in compression to minimize the bending of the insulator during operation of the laser. Since the ceramic is strong in compression but weak in bending, this particular support configuration insures that under load the insulator will maintain its structural integrity.

Other inventive aspects of the compact excimer laser of the present invention are the provision of a filter formed as an electrostatic precipitator to filter out a portion of the gas within the laser. The filtered gas is then re-introduced only to selected crucial areas to insure that these crucial areas do not become contaminated by the particulates produced during the firing of the laser. Specifically, the clean gas is introduced around the window areas and at particular bearing structures to insure that these areas do not become contaminated during the useful operational life of the laser.

Since the laser of the present invention produces a relatively low amount of contamination because of the elimination of plastic insulators, and since clean filtered gas is introduced at the most crucial areas to insure that these areas do not become contaminated, this extends the useful operational life of the laser. In order to insure that the electrostatic precipitator, which provides for the filtering, operates properly with a minimum size, the internal structure of the precipitator is designed to provide a laminar flow of the gas in order to maximize the filtering by reducing turbulent mixing forces relative to the electrostatic forces and thereby maximizing the capture of any particulate material.

Other aspects of the compact excimer laser of the present invention is the use of a fan located internally within the laser to provide for the proper circulation of the gas, with this fan driven in a novel way using a brushless DC drive motor. The DC drive motor incorporates an internal sealed rotor to eliminate the necessity of providing a rotating shaft seal extending through the wall of the laser.

The compact excimer laser of the present invention, therefore, incorporates a number of novel structural elements to reduce the size of the laser, to enhance the reliability of the laser and to increase the performance of the laser when compared with prior art structures.

DESCRIPTION OF THE DRAWINGS

A clearer understanding of the present invention will be had with reference to the following description and drawings wherein.

FIG. 2 is a side cross sectional view of the upper portion of the compact excimer laser taken along lines 2—2 of FIG. 1;

FIG. 3 is one end view of the excimer laser of the present invention from an external position;

DETAILED DESCRIPTION OF THE PREFERRED EMBODIMENT

Figure 1:
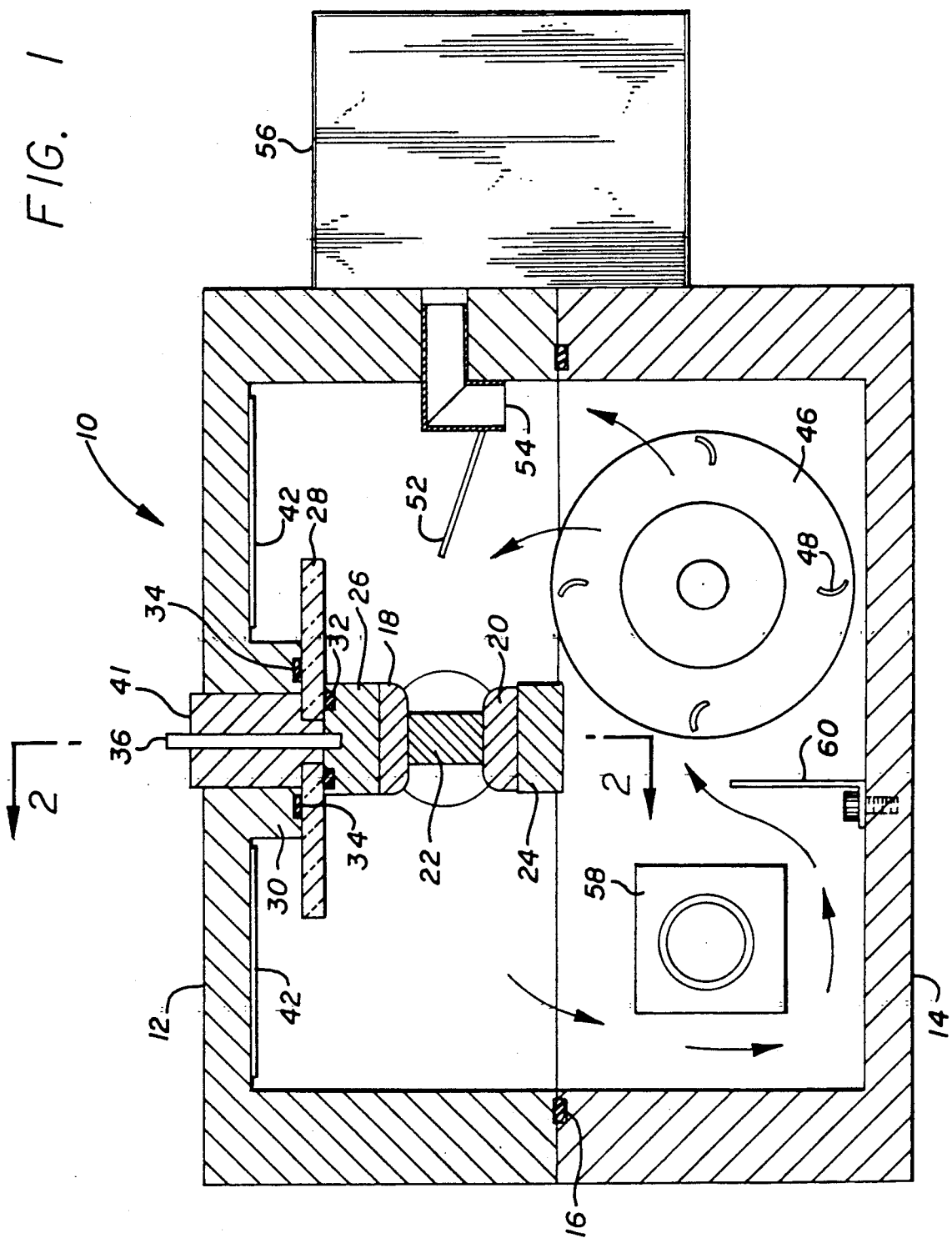
FIG. 1 is an end cross sectional view of the internal structure of the compact excimer laser of the present invention.

As can be seen in FIGS. 1 and 2, an excimer laser 10 of the present invention is formed by a pair of half housing members 12 and 14 formed of aluminum. The housing members 12 and 14 are coupled together and sealed using an "O" ring seal 16 which extends around the perimeter of the housing formed by the members 12 and 14. FIG. 1 illustrates the interior of the laser showing the various components from an end view and with FIG. 2 illustrating the top half of the laser 10.

Located within the interior chamber formed by the housing is a cathode 18 and an anode 20. Located between the cathode and anode is an electrical discharge area 22 and it is from this electrical discharge area that high energy ultraviolet pulses generated by the firing of the laser are produced. The high energy ultraviolet pulses that are produced are along an axis located between the cathode and anode and the axis is, therefore, in a direction perpendicular to the plane of the laser shown in FIG. 1. The electrical discharge is produced by a high voltage impressed on the cathode 18 which may be a voltage of approximately 20 kilovolts. The anode and cathode may be constructed of suitable high purity metals chosen so as to minimize the erosion of the electrodes, and to avoid contaminating the laser gas with erosion products which do form.

An extension for and support of the anode 20 is provided by a base member 24. Spacer member 26 extends between the cathode 18 and main insulator plate 28. The spacer member is used to provide for an electrical connection to the cathode 18. The spacer 26 also provides for a seal around the high voltage connection 36. The main insulator 28 is constructed of a ceramic material such as aluminum oxide $Al_2O_3$.

The upper housing member 12 includes downwardly extending wall portions 30 so that the main insulator 28 is stood off from, or floating relative to, the upper wall and surrounding portions of the upper housing member 12. The spacer member 26 includes round recesses and "O" rings 32 located on one side of the insulators 28 and the wall portions 30 also include recesses and "O" rings 34 located on the other side so that the central portion of the main insulator 28 is held between the "O" ring assembly in compression.

As described above and shown in the drawing the ceramic insulator is held on compression between the extending wall portion 30 and the spacer member 26. This structure is advantageous since the ceramic main insulator 28 is relatively strong in compression but is relatively weak in bending. The support structure thereby provides for the ceramic insulator 28 to be supported at center positions in compression between the spacer 26 and wall portions 30 as sealed by the "O" rings assembles 32 and 34, but yet the remainder of the insulator extends outwardly to provide for the proper insulation but unsupported so that the main insulator is not subjected to bending forces due to gas pressures and loads.

The purpose of the ceramic main insulator 28 is to electrically insulate the cathode 18 from the walls of the housing 12, thereby insuring that the proper electrical discharge takes place between the cathode 18 and anode 20. When high voltage is applied to the cathode 18 via the high voltage connected 36, there is a tendency for undesirable currents to flow over the surface of the main insulator 28 to the grounded housing walls 12. How well the main insulator resists this current flow depends in part on the distance these currents have to flow (the farther the better), and on how close the surfaces of the main insulator are to the grounded housing walls 12 (again, the farther the better).

The use of a floating ceramic main insulator 28 is important in the design of the present invention because it maximizes, for a given size insulator, the distance parasitic currents must flow to reach the grounded housing 12. If the insulator were positioned against the upper surface of the housing 12, then the shortest path for parasitic currents to flow would be essentially equal to the half-width of the insulator. By having the main insulator spaced away from the housing, the path length is doubled, since the current flow has to extend outward and then double back before it reaches the wall position 30. By lengthening the current path without actually making the insulator larger, this allows the size of the laser 10 to be reduced significantly.

Of equal importance, spacing the surface of the main insulator 28 away from the grounded housing 12 reduces the capacitive coupling between the parasitic surface currents and ground. In short-pulse lasers (such as the present invention), in which the excitation is applied for very short durations, the capacitive coupling between the surface currents and ground enhances the flow of current. By spacing the main insulator 28 away from the housing wall 12, capacitive coupling and hence parasitic current flow is reduced. This allows a further reduction in the size of the main insulator 28, resulting in an even more compact laser 10.

The high voltage current to produce the electrical discharge is supplied to the cathode 18 through a plurality of high voltage connectors 36. These connectors 36 extend down through outer support structures. Each high voltage connector 36 extends through a plastic insulator 41, and it should be noted that this insulator 41 may be made of plastic and not of ceramic material since this insulator is completely sealed from the gas within the interior chamber of the laser 10. As can be seen, the gas is isolated because of the "O" rings 32 and 34.

As can be seen in FIG. 2, each of the cathode 18 and anode 20 is formed as one continuous member. It should be appreciated that the cathode and anode may actually be formed of a series of members equal in number to the groups of high voltage connectors. As shown in FIGS. 1 and 2 plates of ceramic material 42 are shown applied to the upper wall 12 to extend across the upper wall at least in the end positions for the ceramic insulator 28. These plates of ceramic material 42 insure that the current path for the electrical current which is flowing along the surface of the main insulators 28 cannot jump to the upper wall 12, but must follow the ceramic insulator back on itself before it can be grounded by the wall portions 30. The plates 42 thereby provide that there is a true doubling of the current path in all directions to insure that the size of the laser may be kept to a minimum because the ceramic insulator 28 acts as if it were twice as wide.

FIG. 1 also illustrates, in general, a circulating path for the gas as the laser is being operated. In particular a fan member 46 extends along the length of the laser and includes a plurality of blades shown schematically as four blades 48 extending along the length of the fan 46. A large plurality of these blades are actually used and this type of fan structure is referred to as a tangential blower. As shown by the arrows the flow of gas is up and through the electrical discharge area 22 as controlled by a vane member 52.

In addition, a gas scoop 54 provides for a portion of the circulated air exiting the fan 46 to be siphoned off for filtering by a filter 56. This filter may be an electrostatic precipitator, the details of which will be described at a later portion of this application. In general, if the gas is KrF, the gas may become contaminated with metal fluoride particles which are formed each time the laser is discharged. Each time the laser discharges, a small amount of metal may be removed from the electrodes and may react with the gas to produce the metal fluoride particles. The filter 56 removes these particles and provides clean air at selected portions of the laser.

The air that has been circulated through the electrical discharge area 22 becomes heated considerably by the electrical discharge and the exhaust gas thereby passes around a water cooled heat exchanger 58. This heat exchanger 58 removes the heat produced by the electrical discharge as the gas passes around it. The cooled gas is now forced upwardly in accordance with a vane 60 to again re-enter the side of the fan 46 for recirculation. The use of the vanes 52 and 60 insures a proper stable path for the circulating air from the fan 46 and up through the discharge area 22 and then around the heat exchanger 58 for cooling before the air is again returned to the fan 46. As indicated above, a portion of the air is captured by the scoop 54 for filtering.

FIG. 3 illustrates one end view of the laser 10 with the other end view being essentially similar but a mirror image. As can be seen in FIG. 3, three cap members are provided at the ends of the laser. One cap supports a window structure generally indicated at 62 with a window member 64 located in the middle of the cap. As an example, the window 64 may be made of magnesium fluoride which is transparent in deep UV light. In order to insure that the areas around the windows are maintained free of particulate contaminates, clean gas from the filter 56 is injected around the windows to prevent particulates from depositing on the windows.

A cap member 66 forms a support for the fan drive. One end of the laser includes a cap which is merely a bearing support but the other end of the laser includes a cap which contains an integrally sealed motor in a manner to be explained in a later portion of this specification. Again, to insure that the bearing structure for the fan does not become contaminated, clean gas from the filter 56 is injected around the bearings of the fan 46 to again insure that no particulates can contaminate the bearings to adversely affect the operation of the circulating fan.

A final end cap 68 supports the heat exchanger 58. The heat exchanger 58 extends from one end of the laser to the other and is a completely sealed unit. The ends of the heat exchanger 58 are sealed to the laser at external positions and with no seals within the laser. Fluid coolant is introduced through the heat exchanger to cool the circulating gas and, because the heat exchanger 58 is sealed at external positions, there can be no leaks of the coolant within the laser.

Figure 4:
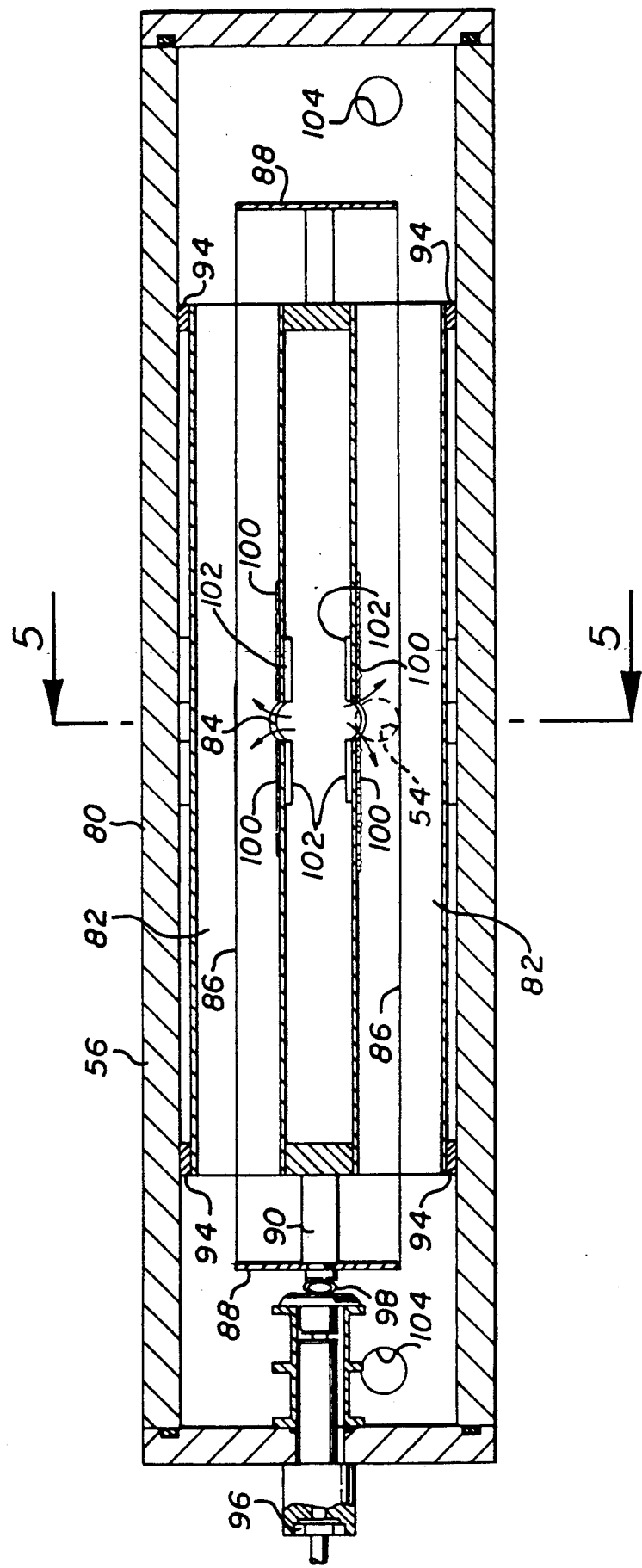
FIG. 4 is a side cross sectional view of an electrostatic precipitator used as a filter with the excimer laser of the present invention.

As shown in FIGS. 1 and 3, the filter 56 may be located to the side of the laser 10. The filter 56 may be formed as an electrostatic precipitator to clean at least a portion of the gas and specifically to clean from this portion of the gas any particulate material which may be produced each time the laser fires. FIG. 4 illustrates a cross sectional view of the precipitator which extends along the length of the laser and with FIG. 5 illustrating a cross sectional view taken along lines 5—5 of FIG. 4.

Figure 5:
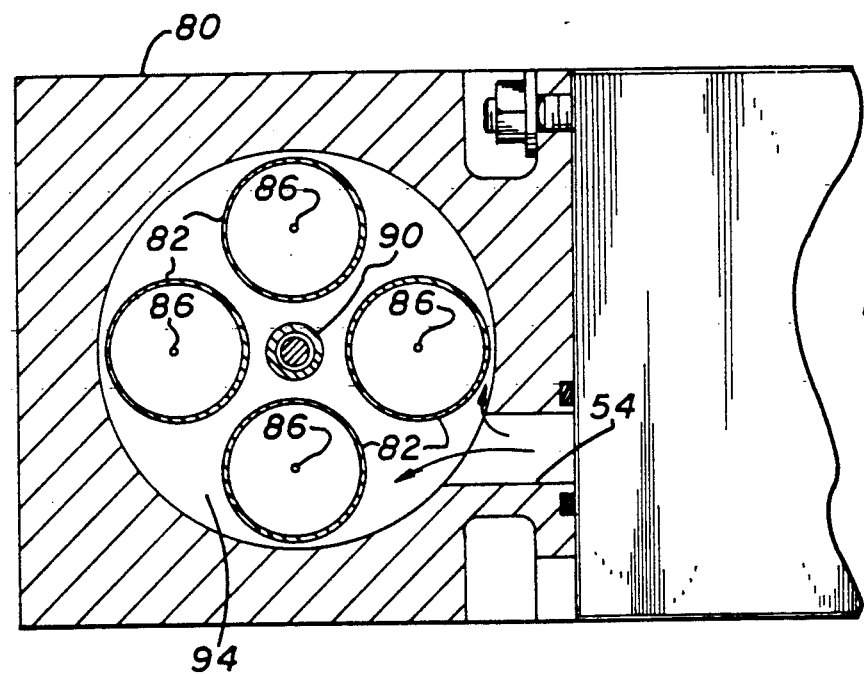
FIG. 5 is a cross sectional view of the electrostatic precipitator of FIG. 4 taken along lines 5—5 of FIG. 4.

As shown in FIGS. 4 and 5 the entrance 54 from the interior of the laser 10 is directed into the electrostatic precipitator filter 56. The precipitator is formed as a tubular member 80 enclosing a plurality of additional tubular members 82 which are supported by a sealing bulkhead 94. Each tubular member includes an opening 84 to receive the dirty gas which enters through the entrance 54. A high voltage wire 86 extends through each of the tubular members 82. All of these wires 86 extend from support members 88 which are supported by a central insulating support 90. The insulating support 90 is mounted on the bulkhead 94. The wires 86 and their support members 88 are therefore insulated from the tubes 82 and bulkheads 94, and are maintained at a high voltage. The tubes 82 and bulkheads 94 are interconnected and grounded to the wall of the outer tube 80. The inner wall of the tube 80 and the bulkheads 94 insure that the flow of dirty gas through the entrance 54 is directed properly to the central openings 84 and into the tubes 82.

A high voltage input 96 provides for a high voltage connection to the wires 86 through a spring connecter 98. This spring connector provides for a proper electrical contact and yet allows the end of the precipitator to be removed for servicing. As high voltage is applied through the high voltage input 96, the wires 86 also provide for a high voltage extending through the center of the tubular members 82. This high voltage provides for an electrostatic field to filter particulates in the dirty gas and to have these particulates deposited along the inner surfaces of the tubes 82 as shown by the deposits 100.

In addition to the electrostatic filtering, cylindrical magnets 102 are located on the exterior surfaces of the tubes 82 to either side of the openings 84 to further the deposition and retention of the particulates which are filtered electrostaticly from the dirty gas. The dirty gas, therefore, enters through the openings 84 and with the particular material deposited on the inner walls of the tubes 82 and with the clean gas exiting the tubes 82 at the end positions. The clean gas then leaves the electrostatic filter 56 through the exit openings 104 located at the end of the filter. Dirty gas, therefore, enters through the center of the filter and exits from the end positions and with the clean gas directed to the window areas and to the bearing areas as will be further explained.

Figure 6:
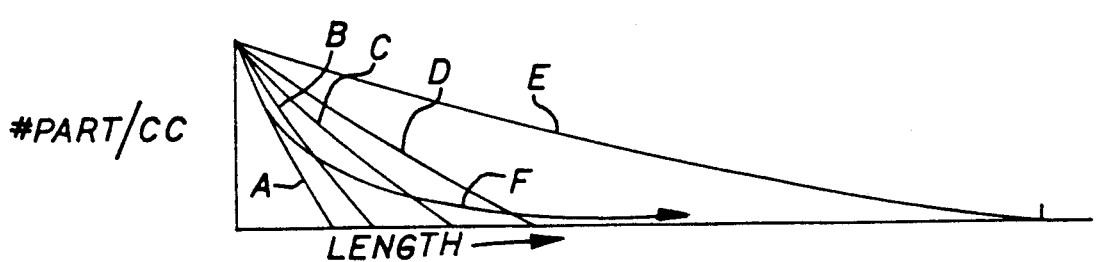
FIG. 6 is a graph illustrating the advantages of laminar flow in the electrostatic precipitator of FIGS. 4 and 5.

The structure of the electrostatic precipitator provides for an efficient filtering of the particulates since the flow of the dirty gas through the electrostatic precipitator is designed to have a laminar flow as opposed to a non-laminar or turbulent flow. FIG. 6 illustrates the differences between the depositing of the particulate material on the tubes 82 for laminar flow relative to non-laminar flow. Specifically, as shown in curves A, B, C, D and E of FIG. 6 and with a laminar flow of gas, particulates of a particular size are deposited along the length of the tubes and with longer length tubes necessary for smaller size particulates. The series of curves A, B, C, D and E represent particulates of decreasing size.

It can be seen that even for very small size particulates there is a length where all of the particulates are deposited within the tube and the length of the electrostatic precipitator for the present invention is sufficient to trap all particulates of sizes of concern. On the other hand, if the flow of gas is non-laminar, as shown by curve F, some particulates are not trapped no matter the length of the tube. In other words, for laminar flow of the gas, there is a length for the tube where all size particulates of concern are trapped, whereas for non-laminar flow, no matter what the length of the tube, the trapping approaches but never equals zero. In this invention, laminar flow is produced by controlling the velocity of the gas flowing in each tube, as well as the diameter of the tubes. This structure maximizes the laminar flow and thereby the efficiency for the electrostatic precipitator of a given length.

Figure 7:
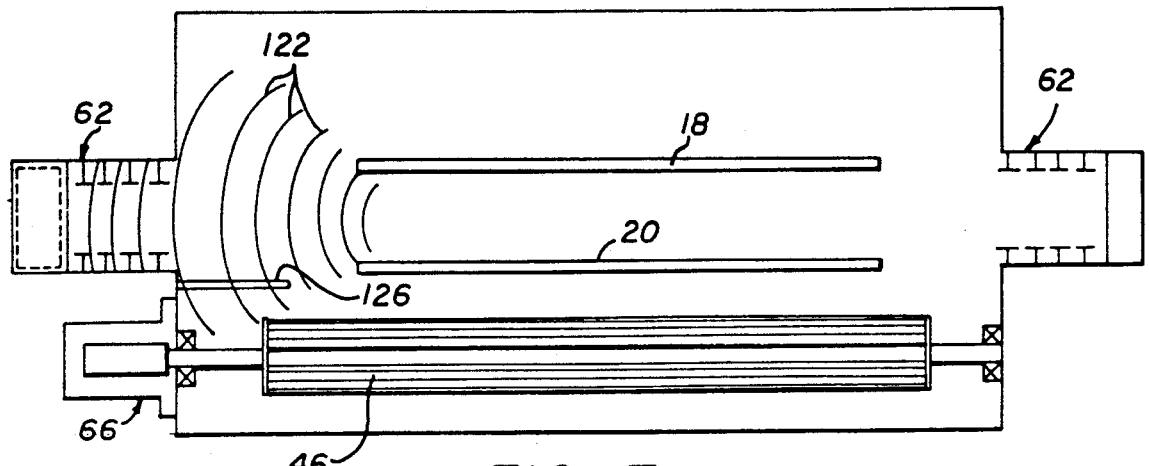
FIG. 7 is a side cross sectional view of the excimer laser of the present invention illustrating details of the circulating fan and window structure.

FIG. 7 illustrates a side view of the laser 10 showing the electrodes 18 and 20 positioned within the laser housing and with the fan 46 located below. One end of the laser housing is shown to include the window structure or cap 62 and the drive structure or cap 66 for the fan 46. As can be seen, the window structure 62 is located adjacent to the ends of the electrodes 18 and 20 in order to allow the high energy ultraviolet pulses to exit through the window structure 62.

Figure 8:
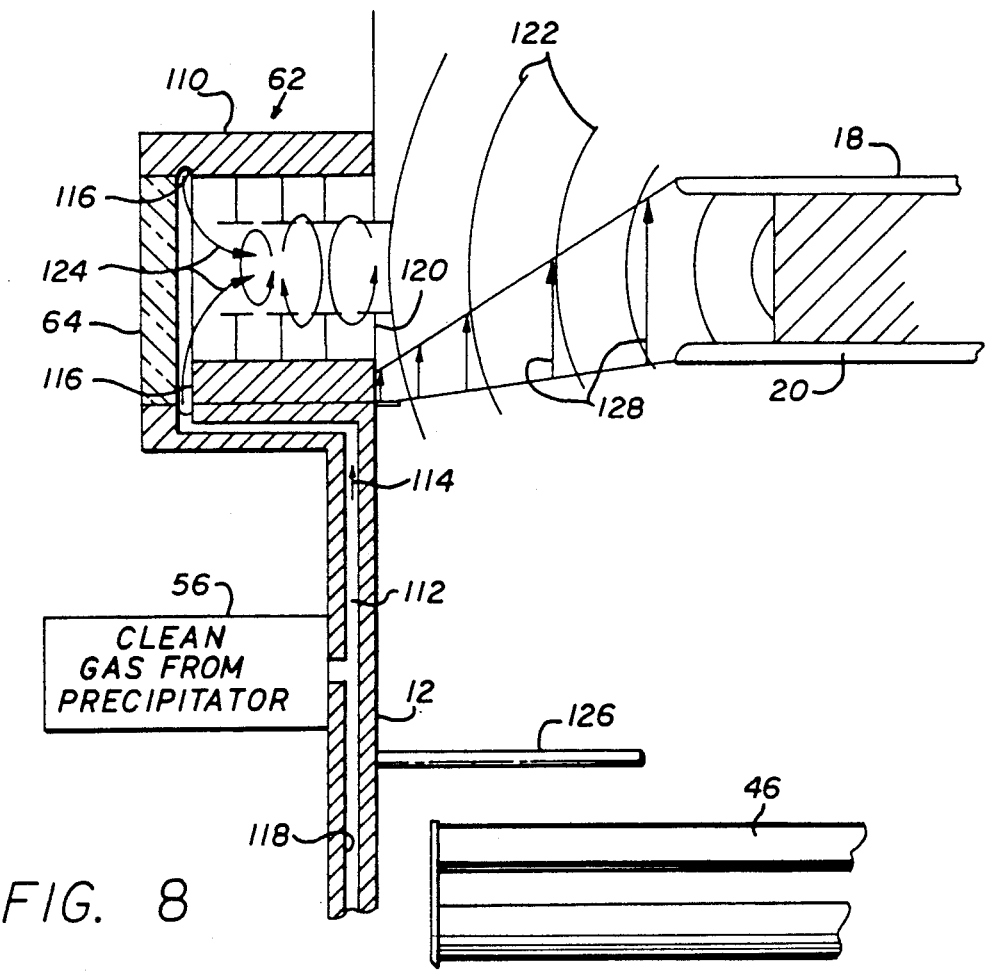
FIG. 8 is a detailed view of FIG. 7 more clearly demonstrating the window structure in association with the circulating gas and as affected by shockwaves.

The window structure 62 may be seen in more detail in FIG. 8 where it is shown that the window structure 62 includes a window 64 located at the end of a housing member 110. The window 64 is formed of a material which is transparent to the wavelength of the high energy pulses so as to allow the high energy pulses to exit the window. For example, if the pulse energy has a wavelength in the deep UV, then the window 64 can be formed of magnesium fluoride.

In order to insure that the windows are kept clean, clean gas from the precipitator 56 is injected around the window to create a constant clean gas area around the windows. This can be seen in FIG. 8 where a clean gas path through the lower laser housing 12 is shown as a pathway 112. The flow of the clean gas from the precipitator 56 is shown by the arrow 114. This flow provides for the constant injection of clean gas around the window. Actually, the pathway for the clean gas extends into and around the window housing 110 as shown by pathway 116 which extends around the window. This insures that clean gas is injected to surround the window from different directions. In addition, it should be noted that clean gas also extends down from the pathway 112 as shown by additional pathway 118 to supply clean gas to the bearings for the fan 46. This bearing structure will be described at a later portion of this specification.

As can be seen in detail in FIG. 8, the interior of the window structure 62 includes a plurality of vanes 120. The vanes are used to attenuate shockwaves and also to provide a plurality of chambers so that any dirty gas coming into the window structure from the interior of the laser moves in circular patterns to minimize the flow of dirty gas to the window 64. Essentially, as the laser is excited to produce the high energy pulses, these excitations produce shockwaves which tend to push any gas within the chamber into the window structure 62. It is desirable to minimize the flow of the dirty gas into the window structure 62 since this could contaminate the window.

The individual vanes produce a plurality of small chambers to trap the gas and force the gas to rotate within the chambers. The gas in successive chambers tends to rotate more slowly than the last in counter rotation to each other, thereby minimizing the flow of the dirty gas into the window area. The vanes also tend to attenuate the shockwaves, and this combination of factors allows the introduction of a relatively low volume of clean gas adjacent the window to counteract the flow of the dirty gas from the interior of the laser. The clean gas flowing towards the interior of the chamber is shown by arrows 124. The above described structure generally allows a modest flow rate of clean gas to pass over the window and still keep the window clean, even though the flow rate of clean gas is much smaller than the dirty gas within the chamber.

As the fan 46 rotates it produces a high velocity flow within the chamber. In order to minimize the velocity of this flow in the areas adjacent to the windows, vane members 126 are provided to cover the fan 46 at the end portions. This effectively reduces the velocity of the dirty gas in the window areas. This reduction of velocity is shown by a graph formed by a series of arrows 128 which illustrate the velocity of the gas adjacent the ends of the electrodes 18 and 20 and with this velocity decreasing as the area adjacent the entrance to the window structure 62 is approached.

All of the above, therefore, provides for an efficient flow of gas within the laser chamber to properly circulate the gas during operation of the laser and yet allow for a minimum amount of gas to be filtered and recirculated into the laser at the most desirable positions. This keeps the most crucial structures, such as the windows, clean without having to clean all of the gas within the laser. In addition, even though the fan 46 provides for a high velocity of the movement of gas within the laser, the vane 126 defuses this velocity at the window entrances to reduce the volocity so that dirty gas is not forced into the window structure. Finally, the use of the plurality of vanes 120 tends to substantially reduce the entrance of dirty gas carried along by shockwaves so that the small volume and velocity of clean gas provided by the electrostatic precipitator 56 allows for a relatively long operational life of the laser windows.

Figure 9:
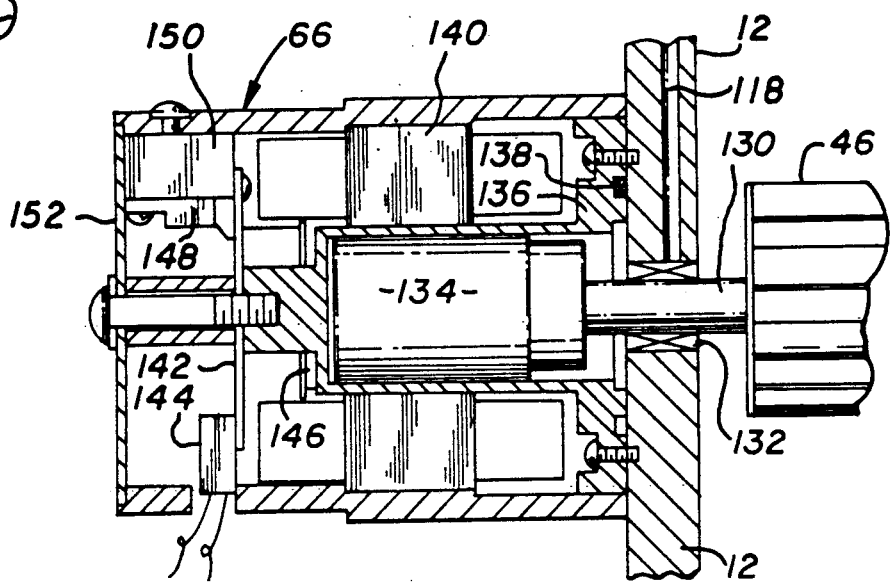
FIG. 9 is a cross sectional detailed view of the motor assembly for driving the circulating fan.

It is desirable to rotate the fan 46 from an exterior position so that the actual motor assembly is not located within the laser chamber. This is because it would be difficult to construct a motor that could operate efficiently within the laser chamber because of the corrosive gas conditions within the chamber. As shown in FIG. 9, the fan 46 is mounted on a shaft 130. The shaft extends through a bearing structure 132 mounted within the wall of the housing 12. The actual motor assembly is contained within the housing or cap 66 shown in end view in FIG. 3.

In general, prior art structures have included exterior motors driving the shaft 130 in an indirect way such as through gears or pulleys. This type of arrangement requires that the drive shaft be equipped with a rotary seal. The present invention provides for a rotor 134 being located on the end of the shaft 130 and with the rotor 134 directly driving the shaft 130 and thereby the fan 46. This provides for a much more efficient and direct system and eliminates the necessity of the rotary sealing system which must be provided with prior art structures.

The rotary seal is eliminated since the seal is provided by a sealing member 136 which is formed as a can of non-corroding material such as stainless steel. The sealing member 136 is mounted to the wall of the housing member 12 using an "O" ring seal 138. It can be seen that the rotor 134 is completely enclosed by the member 136 and is sealed to the wall of the housing 12. Therefore, any corrosive gas which passes through the bearing structure 132 is still sealed since the gas is enclosed by the member 136 and the gas can only contact the rotor 134. The rotor, however, is substantially impervious to the gas since the rotor is formed by magnets covered by non-corrosive material such as stainless steel.

Surrounding the rotor 134 and the sealing member 136 is a stator 140 which is a series of windings. The stator 140 and rotor 134 together form a brushless DC motor which operate in a normal manner. The major difference between a normal brushless DC motor and the present invention is the use of the sealing member 136 located between the stator and rotor so that the rotor is fluid sealed relative to the stator 140. This structure provides for a simple brushless motor being mounted to the side of the housing 12 to directly drive the fan 46 and yet with a seal provided without the necessity of having this seal being a rotating seal.

The remaining portions of the motor include a circuit board 142 to direct power from a power input connector 144 to the stator 140. In order to insure that the motor is properly operating, a Hall detector 146 is located outside the sealing can 136 to detect the rotational position of the magnets within the rotor 134. A signal from the Hall detector is then fed back to the circuit board 142 to control the phase of the power to the stator to keep the rotor in lock.

A cover plate 152 may be positioned at the end of the housing 66 to finish the enclosure structure. It can be seen that the entire rotor assembly is mounted at the exterior of the laser chamber without any further external drive such as through pulleys or gears and yet with the rotor being completely sealed relative to the stator. The only moving parts subjected to the corrosive gas within the laser are the rotor and fan itself. As indicated above, this structure completely eliminates the necessity for providing for rotating seals.

It can be seen, therefore, that the present invention provides for a compact excimer laser which essentially eliminates the use of plastic insulators and provides for ceramic insulators which do not degrade and break down as do plastic insulators, so as to minimize the production of contaminants. The use of all ceramic insulating material within the laser greatly increases the overall reliability of the laser. Because there are much less breakdowns and contaminants within the laser, this minimizes the necessity to have an external gas reprocessor as with prior art lasers. The minimal production of contaminants in the present invention only necessitates the cleaning of a portion of the gas and subsequent diversion of this clean gas to important areas, such as the window areas and the bearing areas. In addition to the above, the specific configuration for the laser of the present invention, including the floating insulator structure, allows for the laser to be reduced to a small size. Even with this small size, the laser of the present invention provides for efficient operation.

All of the above advantages, and additional ones such as the use of an electrostatic precipitator and an integral brushless DC motor design, provide for a superior structure for the compact excimer laser of the present invention. Although the laser has been described with reference to a particular embodiment, it is to be appreciated that various adaptations and modifications may be made and the invention is only to be limited by the appended claims.

We claim:

1. In combination in an excimer laser for use with a gas capable of a lasing action,
 a housing structure having a plurality of walls defining a laser cavity for receiving and holding the gas,
 a pair of spaced electrodes disposed within the laser cavity and forming an electrical discharge area between the electrodes for stimulating gas within the discharge area to lasing action in accordance with an electrical discharge between the electrodes,
 means including a motor and a fan for circulating the gas within the laser cavity,
 means for filtering at least a portion of the circulating gas to precipitate particulates from the gas,
 a window for passing, from a position inside the laser cavity to a position outside the housing, energy produced by the energy discharge between the electrodes, means for inhibiting the flow of unfiltered gas to the window to inhibit the deposit of the particulates on the window, and means for passing clean air past the window to further inhibit the deposit of the paticulates on the window.

2. A combination as set forth in claim 1, including, means for grounding one of the electrodes, and means disposed in the housing relative to the other electrode for inhibiting an electrical discharge between such other electrode and the housing.

3. A combination as set forth in claim 2, including, the motor having a rotor and a stator, the fan being disposed within the housing and the stator being disposed outside of the housing, and means disposed relative to the rotor for sealing the rotor relative to the housing for communication of the rotor only with the laser cavity.

4. A combination as set forth in claim 3, including, the rotor including magnets and being covered by a non-corrosive material.

5. A combination as set forth in claim 4, including, a shaft coupling the fan to the rotor, and a bearing disposed in the housing for providing for a support of the shaft and a rotation of the shaft relative to the housing.

6. A combination as set forth in claim 3, including, the filtering means providing for a laminar flow of the circulating gas and for a precipitation of the particulates in the circulating gas during such laminar flow.

* * * * *